United States Patent [19]
Glenn, Jr.

[11] 4,217,659
[45] Aug. 12, 1980

[54] ACOUSTIC LOGGING FOR EXAMINATION OF THE CEMENT BONDING OF WELL CASING

[75] Inventor: Edwin E. Glenn, Jr., Dallas, Tex.

[73] Assignee: Mobil Oil Corporation, New York, N.Y.

[21] Appl. No.: 875,716

[22] Filed: Feb. 6, 1978

[51] Int. Cl.$^2$ .............................. G01V 1/40; G01V 1/30
[52] U.S. Cl. ........................................ 367/35; 367/30; 367/32
[58] Field of Search ............... 340/15.5 A, 15.5 AC, 340/15.5 BH, 15.5 TC; 367/35, 32, 30

[56] References Cited

U.S. PATENT DOCUMENTS

| | | | |
|---|---|---|---|
| 2,210,417 | 8/1940 | Kinley | 73/40.5 A |
| 2,396,935 | 3/1946 | Walstrom | 340/15.5 SW |
| 3,265,151 | 8/1966 | Anderson | 340/15.5 A |
| 3,588,800 | 6/1971 | Moore et al. | 340/15.5 CF |
| 3,732,947 | 5/1973 | Moran et al. | 340/15.5 BH |
| 3,781,784 | 12/1973 | DeBerandes | 340/gg.5 AC |
| 3,909,775 | 9/1975 | Lavigne | 340/15.5 BH |
| 3,962,674 | 6/1976 | Howell | 340/15.5 BH |

FOREIGN PATENT DOCUMENTS 544925 1/1977 U.S.S.R. .......................... 340/15.5 BH

OTHER PUBLICATIONS

R. M. McKinley et al., *Journal of Petroleum Technology*, 3-1973, pp. 329-338.

*Primary Examiner*—S. C. Buczinski
*Attorney, Agent, or Firm*—C. A. Huggett; William J. Scherback

[57] ABSTRACT

An acoustic source and a spaced-apart acoustic receiver are moved through the casing of a well. Electrical signals indicative of the source signal and the receiver signal are applied uphole by way of a conductor to a time series analyzer and recorder. The time series analyzer provides power-spectral density functions and cross-spectral density functions of the source and receiver signals during reconnaissance logging operations. From these functions there is determined the ability of the casing-cement formation combination to transmit the source signal to the receiver and also the linear correlation of the source signal and receiver signal.

3 Claims, 3 Drawing Figures

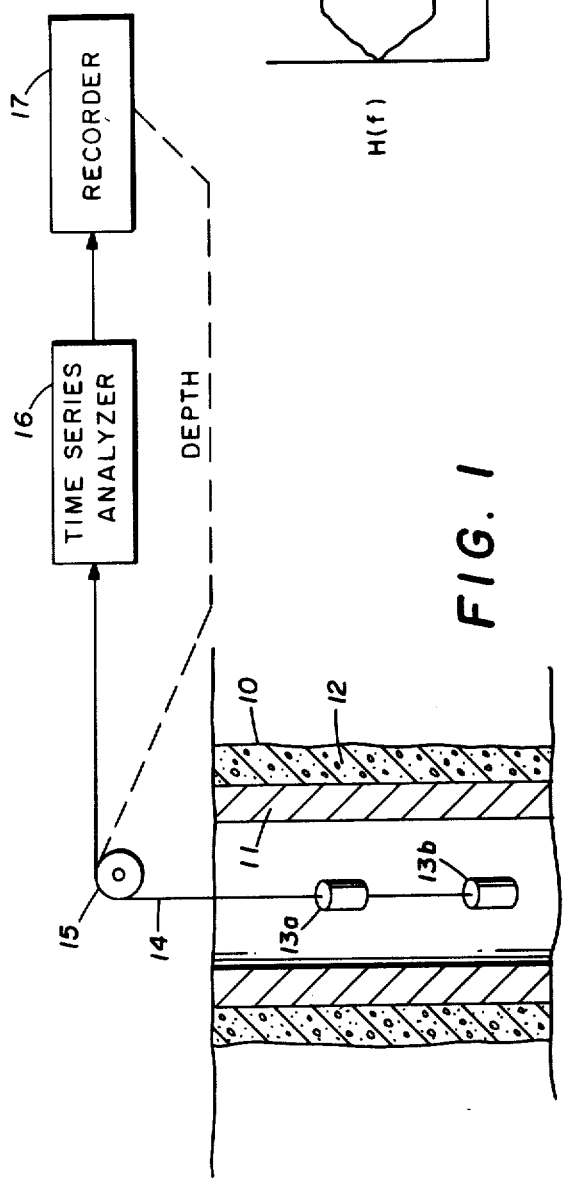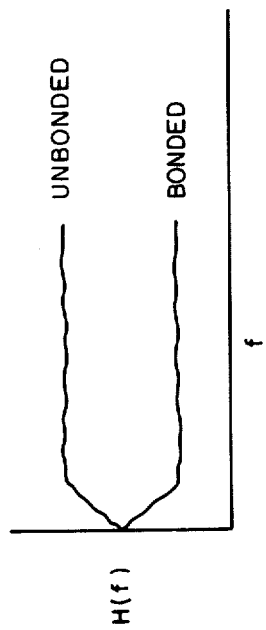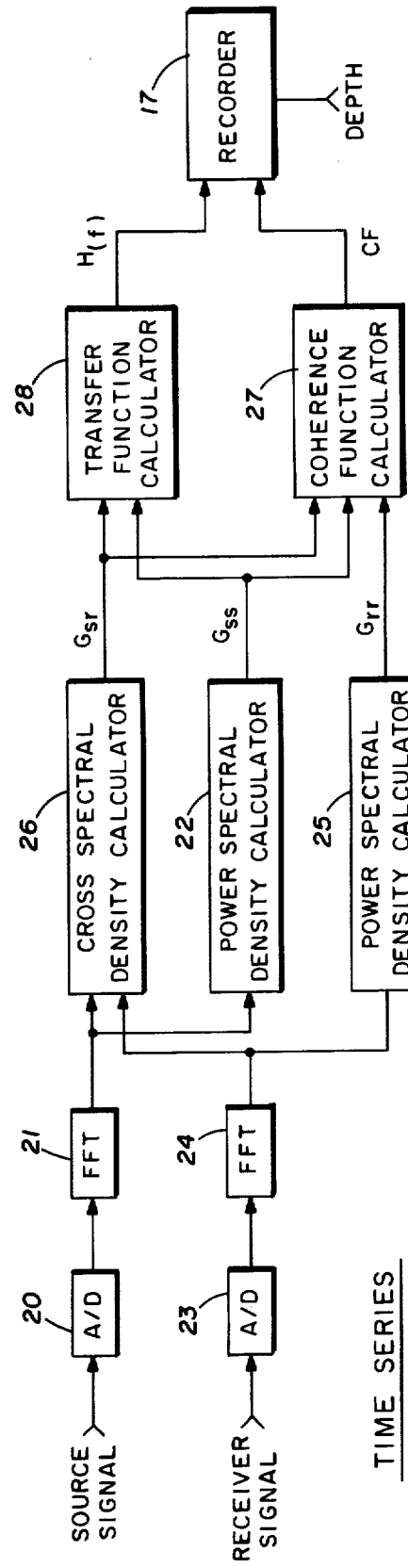

4,217,659

ACOUSTIC LOGGING FOR EXAMINATION OF THE CEMENT BONDING OF WELL CASING

BACKGROUND OF THE INVENTION

This invention relates generally to acoustic well logging and more particularly to the determination of the quality of the cement bonding of the casing to the formation in an oil or gas well.

In the completion of wells, casing is normally lowered into the well and a cement slurry is flowed down the casing and up the annular space between the casing and the wall of the well. The casing, when cemented into place, isolates the oil- or gas-producing formation from other formations surrounding the wellbore.

In some well completions, the cement bond between the casing and the formation surrounding the wellbore will contain undesirable defects which can permit undesirable fluid flow communication between the production formation and formations above or below the production formation. Acoustical noise logging of completed wells to determine the location of fluid flow thereinto is well known in the art. For example, in U.S. Pat. No. 2,210,417 to Kinley, leaks through or behind the well casing are located by determining the location of sound produced by liquid passing through openings in the casing or behind the casing. A sound detector is moved through a well and is connected to an uphole, indicating device or recording means. The intensity of sound of liquids passing through the casing is indicative of casing leaks, and location of such leaks is readily discernible from a graphical record of intensity versus the depth of the sound detector within the well. A similar method of detecting casing leaks is disclosed in U.S. Pat. No. 2,396,935 to Wahlstrom.

SUMMARY OF THE INVENTION

In accordance with the present invention there is provided a borehole logging system for logging a cased well to determine the quality of the cement bonding of the casing to the formation. Such tool employs an acoustic source and an axially spaced acoustic receiver which are moved through the well during the cement bond logging operation. A first signal is produced representative of the power-spectral density of the signal generated by the acoustic source. A second signal is also produced representative of the cross-spectral density of the signals generated by both the acoustic source and the acoustic receiver. The ratio of the cross-spectral density to the power-spectral density is then determined to indicate the attenuation of the signal from the acoustic source as it passes through the casing-cement-formation combination to the acoustic receiver.

In a further aspect, the signals generated by the acoustic source and the acoustic receiver are linearly correlated as an indication of the coherence of these signals. In determining such linear correlation, the cross-spectral density of the signals from the acoustic source and the acoustic receiver is multiplied by its complex conjugate, and the product thereof is divided by the product of the power-spectral densities of the signals from the acoustic source and acoustic receiver. Such determination is an indication of the coherence of the signal from the acoustic source with the signal received at the acoustic receiver for all frequencies of the signal from the acoustic source.

BRIEF DESCRIPTION OF THE DRAWINGS

FIG. 1 illustrates an acoustic logging system of the present invention for determining the quality of the cement bonding with a well.

FIG. 2 is a schematic diagram depicting a specific configuration for the time series analyzer of the logging system of FIG. 1.

FIG. 3 illustrates a frequency spectrum analysis of the transfer function of the source and receiver signals carried out by the time series analyzer of FIG. 2.

DESCRIPTION OF THE PREFERRED EMBODIMENT

Referring now to FIG. 1, there is illustrated an acoustic logging system employed for carrying out the method of the present invention. A well 10 traverses the subsurface formations. A well casing 11 is cemented in place with a cement sheath 12. An acoustic source 13a and an acoustic receiver 13b are suspended in the well by a conductor cable 14 which passes over the sheave 15 to a time series analyzer 16 and recorder 17.

In a preferred mode of operation, the acoustic source 13a and acoustic receiver 13b are lowered to a desired location in the borehole, normally below a section of the casing 11 that is to be examined for quality of the bonding of the casing to the formation by the cement sheath 12. In a reconnaissance mode of operation, the acoustic source 13a and acoustic receiver 13b are continuously advanced up the borehole past the section of casing to be examined. Utilization of a time series analysis of the source and receiver signals by the time series analyzer 16 during such reconnaissance operation provides a measure of the quality of the cement bonding.

More specifically, the casing-cement-formation combination is examined for its ability to transmit the source signal to the receiver. This examination is carried out in the time series analyzer 16 by the calculation of a transfer function, H(f), for all frequencies supplied by the source signal.

For a more detailed understanding of such transfer function calculation by the time series analyzer 16, reference is made to FIG. 2. The acoustic source signal is applied through the analog-to-digital converter 20 and the Fourier transformer 21 to the power-spectral density calculator 22 and the cross-spectral density calculator 26. The acoustic receiver signal is applied through the analog-to-digital converter 23 and the Fourier transformer 24 to the power-spectral density calculator 25 and the cross-spectral density calculator 26. Calculator 22 provides the power-spectral density of the source signal, $G_{ss}$, while calculator 25 provides the power-spectral density of the receiver signal, $G_{rr}$. The power-spectral density provides the frequency spectrum of the source and receiver signals. Calculator 26 provides the cross-spectral density of the source and receiver signals, $G_{sr}$. The cross-spectral density is the frequency-domain counterpart of the crosscorrelation function in the time domain. The outputs from calculators 22 and 26 are applied to the transfer function generator 28 which determines the ratio of the cross-spectral density. $G_{sr}$, to the source power-spectral density, $G_{ss}$. Such ratio is the desired transfer function H(f):

$$H(f) = \frac{G_{sr}(f)}{G_{ss}(f)} \tag{1}$$

Such transfer function H(f) describes the ratio of the amplitude of the receiver signal to the amplitude of the source signal (i.e., gain factor) and the phase shift between such signals over the range of frequencies. The frequency characteristic of the transfer function will look like that shown in FIG. 3 for either the bonded or unbonded casing. For a well-bonded casing, the transfer function will be low, indicating the attenuation of all frequencies of the source signal, especially the higher frequencies. This means that the casing-cement-formation combination absorbs source energy readily and transmits a relatively small amount to the receiver. For a poorly bonded casing, the transfer function will be high, indicating little source signal attenuation, especially at the higher frequencies. This means that the casing-cement-formation combination transfers a large amount of the source energy to the receiver mostly through the casing. It can therefore be seen that the transfer function describes the casing-cement-formation combination's treatment of the source signal. Changes in such transfer function, H(f), as it is recorded on the recorder 17 as the source 13a and receiver 13b are moved through the casing, will correlate with the cement bonding quality of the well to provide an easily interpretable cement bond log.

The reliability of such cement bond log is dependent upon the coherence, or linear correlation, of the source signal and the receiver signal in the frequency domain. Such coherence will range from 0 for uncorrelated signals to 1 for fully correlated signals. If the coherence is high, above about 0.8, for example, the source and receiver signals correlate very well over the frequency range. This means that the receiver signal is made up largely of the source signal content, that is, the casing-cement-formation combination contributes few additional frequencies to the receiver signal. If the coherence is low, between 0 and about 0.8, for example, the receiver signal is not influenced greatly by the source signal. This means that the receiver signal is caused by noise sources from other than the source 13a. Consequently, the coherence between the source and receiver signals should be high in order for there to be confidence in the calculation of the transfer function.

Such coherence can be determined through the calculation of a coherence function CF for all frequencies by the time series analyzer 16. Referring again to FIG. 2, the outputs of the calculators 22, 25, and 26 are all applied to the coherence function generator 27 which determines a squared power ratio from multiplying the cross-spectral density of the source and detector signals by its complex cojugate (*) and dividing their product by the product of the power-spectral densities of such signals:

$$CF^2(f) = \frac{G_{sr}(f) \cdot G_{sr}^*(f)}{G_{ss}(f) \cdot G_{rr}(f)} \quad (2)$$

$$0 \leq CF^2 \leq 1 \quad (3)$$

$$0 \leq CF^2 \leq 1 \quad (3)$$

This coherence function shows the coincidence of harmonic content of the source and detector signals and ranges in value from 0 to 1. If the coherence function is in excess of about 0.8, the signals correlate very well over that frequency range, that is, the signals received by the receiver 13b are primarily from the source 13a.

In the above-described preferred embodiment, the acoustic source 13a and the acoustic receiver 13b may each be a lead-zirconate-titanate piezoelectric ceramic transducer No. 5500 supplied by Channel Industries, Inc., 839 Ward Drive, Santa Barbara, California 93111. The time series analyzer 16 may be supplied by the Time/Data Company, 2855 Bowers Avenue, Santa Clara, California 95051. under Model TDA-30L. This particular time series analyzer system performs a broad range of preprogrammed time series analysis techniques by combining building-block type modules into various system configurations such as that illustrated in FIG. 2.

Although the present invention has been described in connection with a preferred embodiment, various modifications and changes may be made without departing from the spirit and scope of the present invention as set forth in the appended claims.

I claim:

1. A system for logging a cased well to determine the quality of the cement bonding of a cased well, comprising:
   (a) a logging tool having an acoustic source and an axially spaced acoustic receiver,
   (b) means for moving said logging tool through said cased well,
   (c) means for determining the attenuation of the signal from the acoustic source as it travels through the casing-cement-formation combination to the acoustic receiver for all frequencies of the signal from the acoustic source, and
   (d) means for determining the linear correlation of the signals provided by said acoustic source and said acoustic receiver as an indication of the coherence of said signals for all frequencies of the signal provided by the acoustic source.

2. The system of claim 1 wherein said means for determining the linear correlation of said signals includes:
   (a) means for producing a power-spectral density function of the signal provided by the acoustic source during logging operations,
   (b) means for producing a cross-spectral density function of the signals provided by said acoustic source and said acoustic receiver during logging operations, and
   (c) means for multiplying said cross-spectral density function by its complex conjugate and dividing the product by the product of said power-spectral density functions of the signals provided by the acoustic source and the acoustic receiver.

3. A system for logging a cased well to determine the quality of the cement bonding of a cased well, comprising:
   (a) a logging tool having an acoustic source and an axially spaced acoustic receiver,
   (b) means for moving said logging tool through said cased well,
   (c) means for producing a cross-spectral density function of the signals provided by said acoustic source and said acoustic receiver during logging operations,
   (d) means for producing a power-spectral density function of the signal provided by said acoustic source during logging operations, and
   (e) means for determining the ratio of said cross-spectral density function to said power-spectral density function as an indication of the ability of the casing-cement-formation combination to transfer the signal from said acoustic source to said acoustic receiver.

* * * * *